May 2, 1933.  M. LAMMERTSE ET AL  1,906,320
MACHINE FOR BUILDING FLEXIBLE CONDUITS
Filed Sept. 15, 1930  4 Sheets-Sheet 1

Inventors
Miendert Lammertse
& John Johnston
Bee & Bush
Attorneys

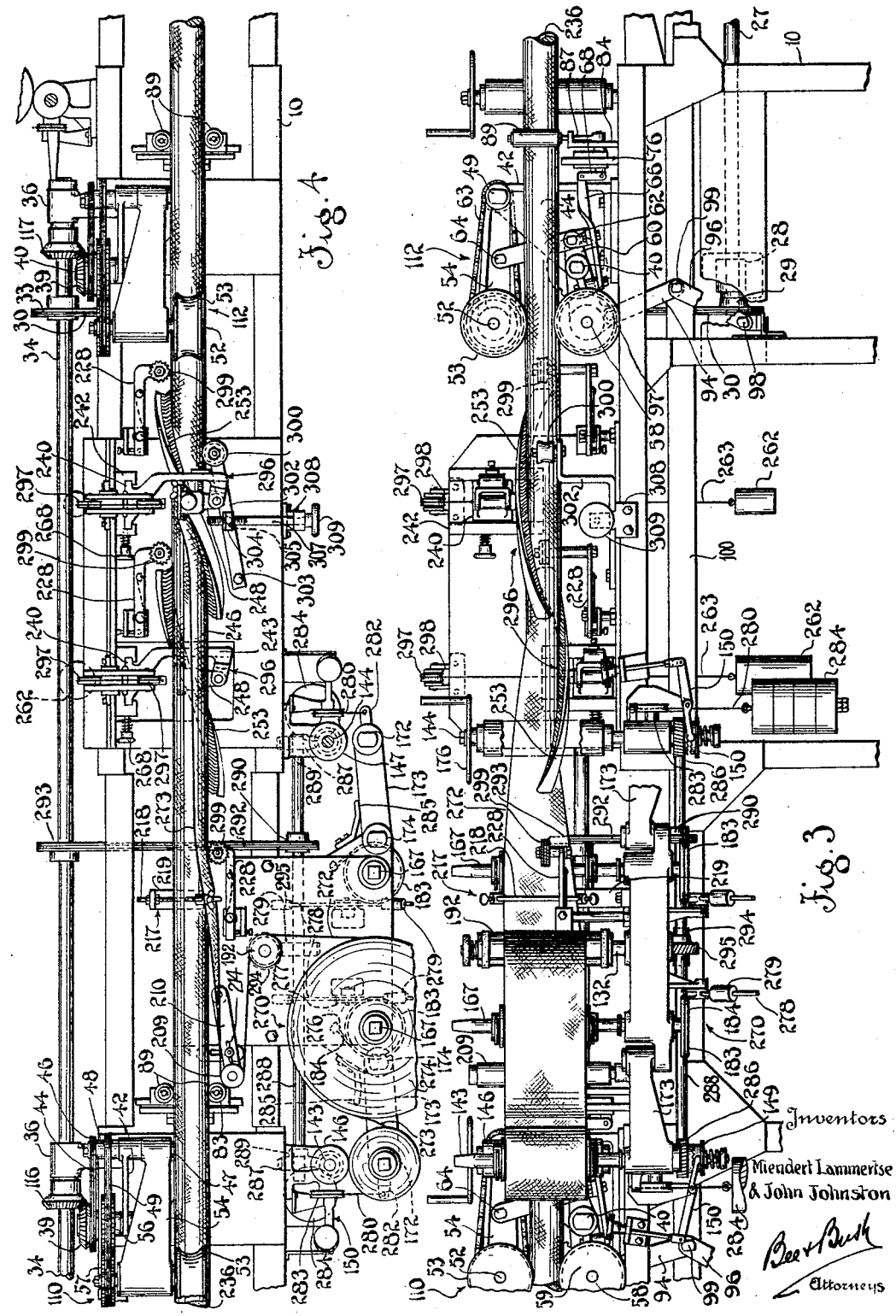

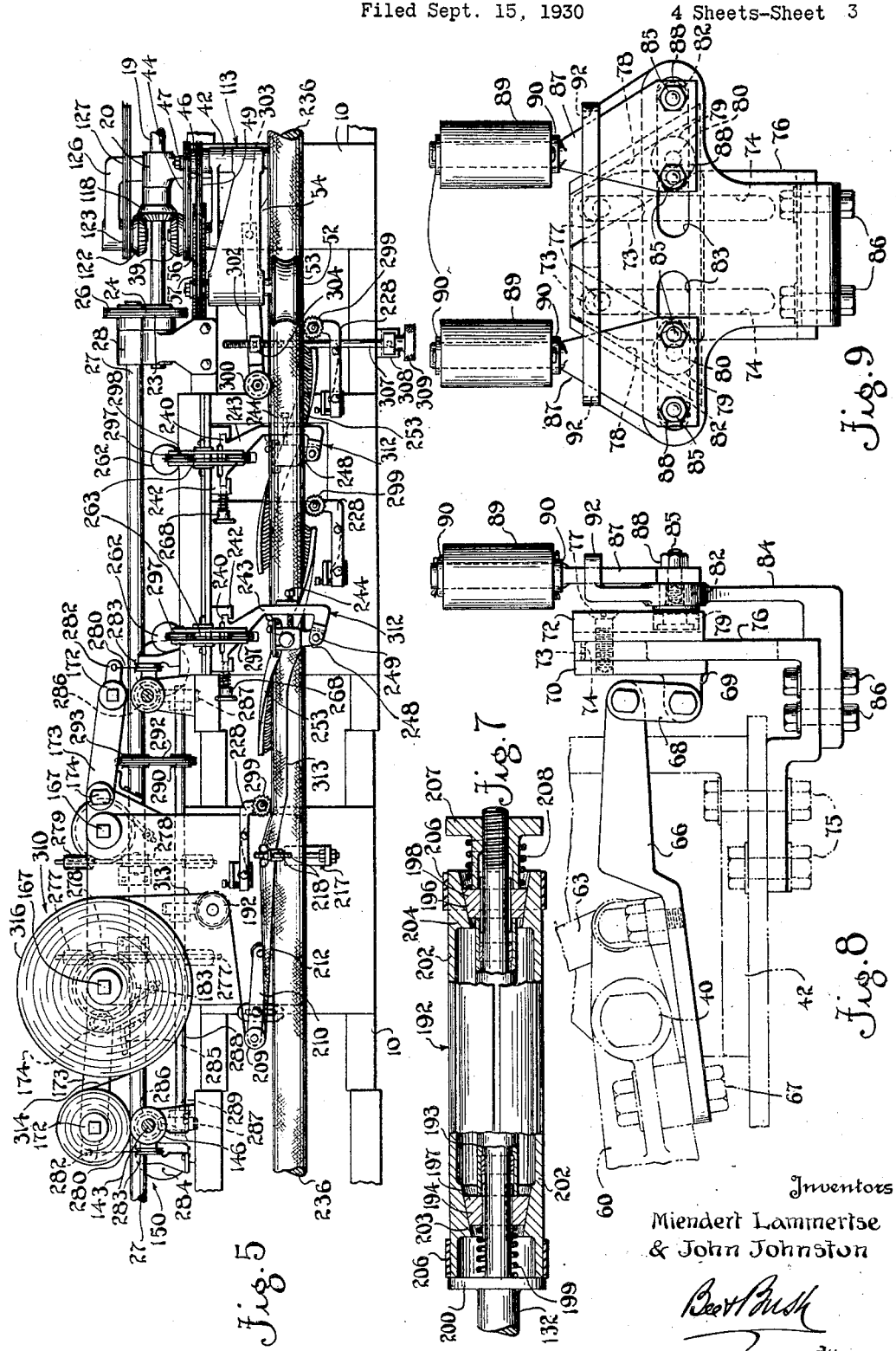

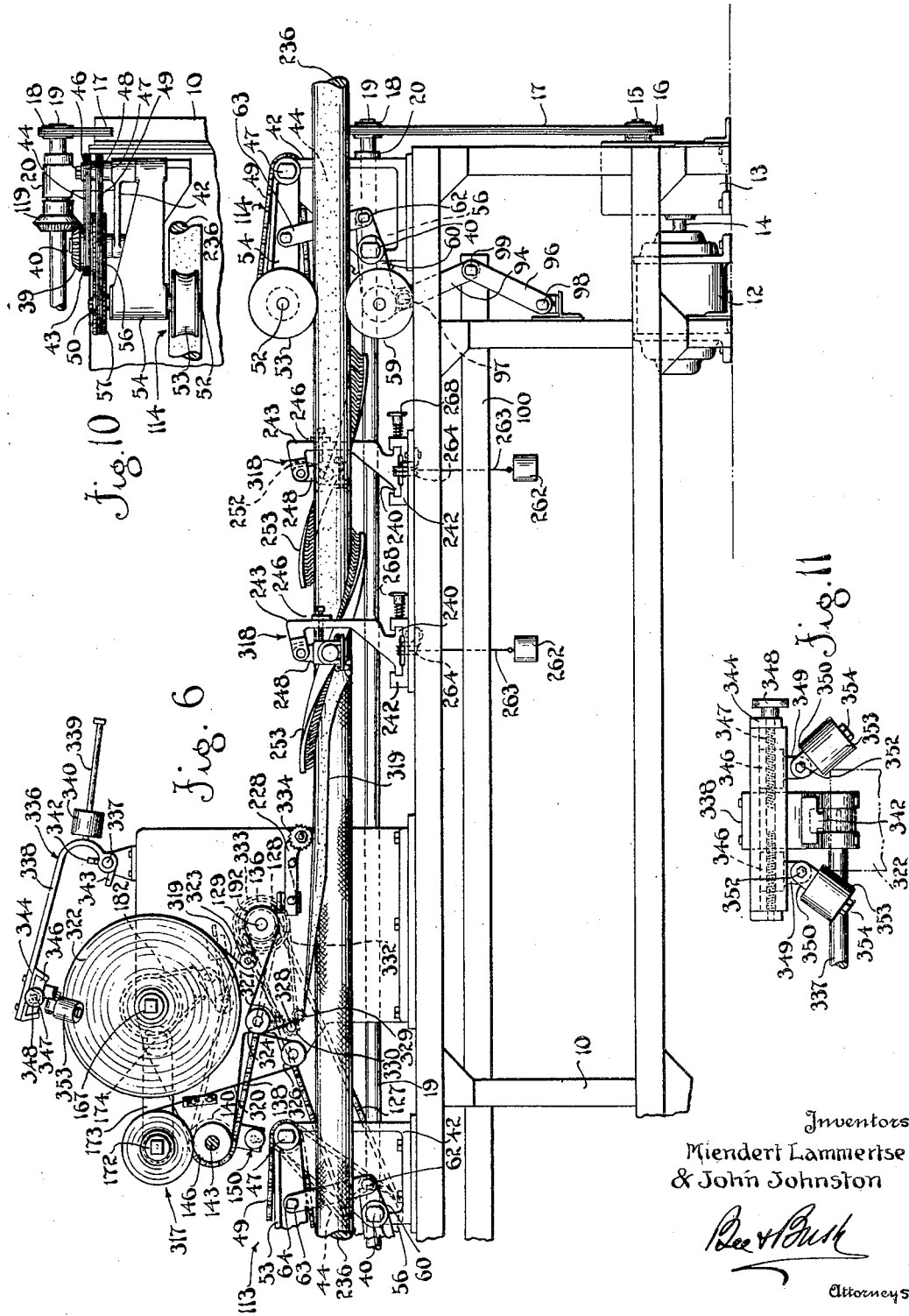

Patented May 2, 1933

1,906,320

UNITED STATES PATENT OFFICE

MEINDERT LAMMERTSE AND JOHN JOHNSEN, OF AKRON, OHIO, ASSIGNORS TO THE GOODYEAR TIRE & RUBBER COMPANY, OF AKRON, OHIO, A CORPORATION OF OHIO

MACHINE FOR BUILDING FLEXIBLE CONDUITS

Application filed September 15, 1930. Serial No. 481,945.

This invention relates to machines for manufacturing flexible conduits and it has particular relation to a machine for automatically assembling strips of material about an elongate mandrel to form such conduits.

One object of the invention is to provide a machine which will automatically apply a plurality of strips of rubber, or rubberized material, to an elongate mandrel by a plurality of devices operable concurrently.

Another object of the invention is to provide a machine that will successively apply a plurality of strips of material to a mandrel in such manner that the edges of the strips will be spaced circumferentially of the finished conduit.

Another object of the invention is to provide a machine of the character designated wherein devices are provided that will accommodate various sizes of mandrels for manufacturing various sizes of conduits.

Another object of the invention is to provide a machine that will apply rubber and fabric material uniformly to a mandrel, and will prevent wrinkling of the material during its application.

Another object of the invention is to provide a machine which is adjustable to vary the tension upon fabric and rubber material prior to its contact with the mandrel upon which it is applied.

Another object of the invention is to provide a machine that will obviate expense and inconvenience of manually building conduits, as well as obviating unevenness of structure, which ordinarily results from manual construction.

Known methods of manufacturing conduits composed of fabric and rubber material involve the employment of a cylindrical steel mandrel upon which a plurality of layers of rubberized fabric and rubber are assembled by rolling the mandrel in a transverse direction successively over a plurality of strips of the material. It is customary to apply an extruded tube of rubber about the mandrel and then the latter is transported to a table upon which a strip of rubberized fabric has been spread. By rolling the mandrel transversely upon the strip of fabric, it readily adheres to the rubber tube. As many strips of fabric or rubber as desired are applied to the mandrel in this manner and then the assembly is wrapped with non-rubberized fabric, preparatory to vulcanization. After removing the wrapped fabric, the conduit is slipped from the mandrel. Although efficient and durable conduits can be manufactured by this procedure, considerable expense is involved because of the numerous manual operations required.

A machine constructed according to this invention provides for the application of a plurality of strips of rubberized fabric and rubber to an elongate mandrel during a continuous movement of the latter in a direction longitudinally of its axis. Particularly the invention involves the novel development of a machine for practicing the method disclosed by the application of Bruce and Gladwin, Serial No. 355,324, for a method of building conduits, filed April 15, 1929 now Patent 1,809,802 issued June 9, 1931. Also, the invention involves practical application and construction of spiral brushes for folding strips of material about a mandrel which were disclosed in the application of Jorgen I. Haase, Serial No. 381,664, for a machine for building rubber conduits, filed July 27, 1929 which issued as Patent 1,827,650 Oct. 10, 1931.

According to this invention, a plurality of mandrel-supporting, concurrently adjustable rollers are provided in order to accommodate mandrels of various diameters, and certain of the rollers are driven for the purpose of moving the mandrel axially. While any convenient number of rubberized fabric and rubber strips may be applied to the mandrel, ordinarily about four are sufficient. Several similar mechanisms are utilized for applying the strips to the mandrel, but they are so spaced with respect to the path of the mandrel that the strips can be applied in successive relation. Moreover, the several mechanisms are so disposed in circumferentially spaced relation about a mandrel supported in the machine that the strips will be applied in circumferentially spaced relation in the finished conduit. Each mechanism includes devices for feeding the fabric or rubber to the mandrel. Since means is provided for effecting a synchronous operation of all of the mechanisms, a proper correlation between the application of all of the strips of material is insured.

For a better understanding of the invention, reference may now be had to the accompanying drawings, forming a part of the specification, of which:

Figure 3 is a fragmentary, side-elevational view of the machine, including a second strip-applying mechanism;

Figure 4 is a plan view of the construction shown by Figure 3;

Figure 5 is a fragmentary, side-elevational view of the machine, including a third strip-applying mechanism;

Figure 6 is a side-elevational view of the machine, including a fourth strip-applying mechanism;

Figure 7 is a cross-sectional view, on a larger scale, illustrating a fabric-feeding, adjustable roller;

Figure 8 is an elevational view, on a larger scale, of a mandrel-guiding roller mechanism;

Figure 9 is an end elevational view of the construction shown by Figure 8;

Figure 10 is a fragmentary plan view of a portion of the construction shown by Figure 6, including one of the mandrel-actuating roller mechanisms; and Figure 11 is a fragmentary, end-elevational view, on a larger scale, of a strip-guiding device.

Figures 1, 2:
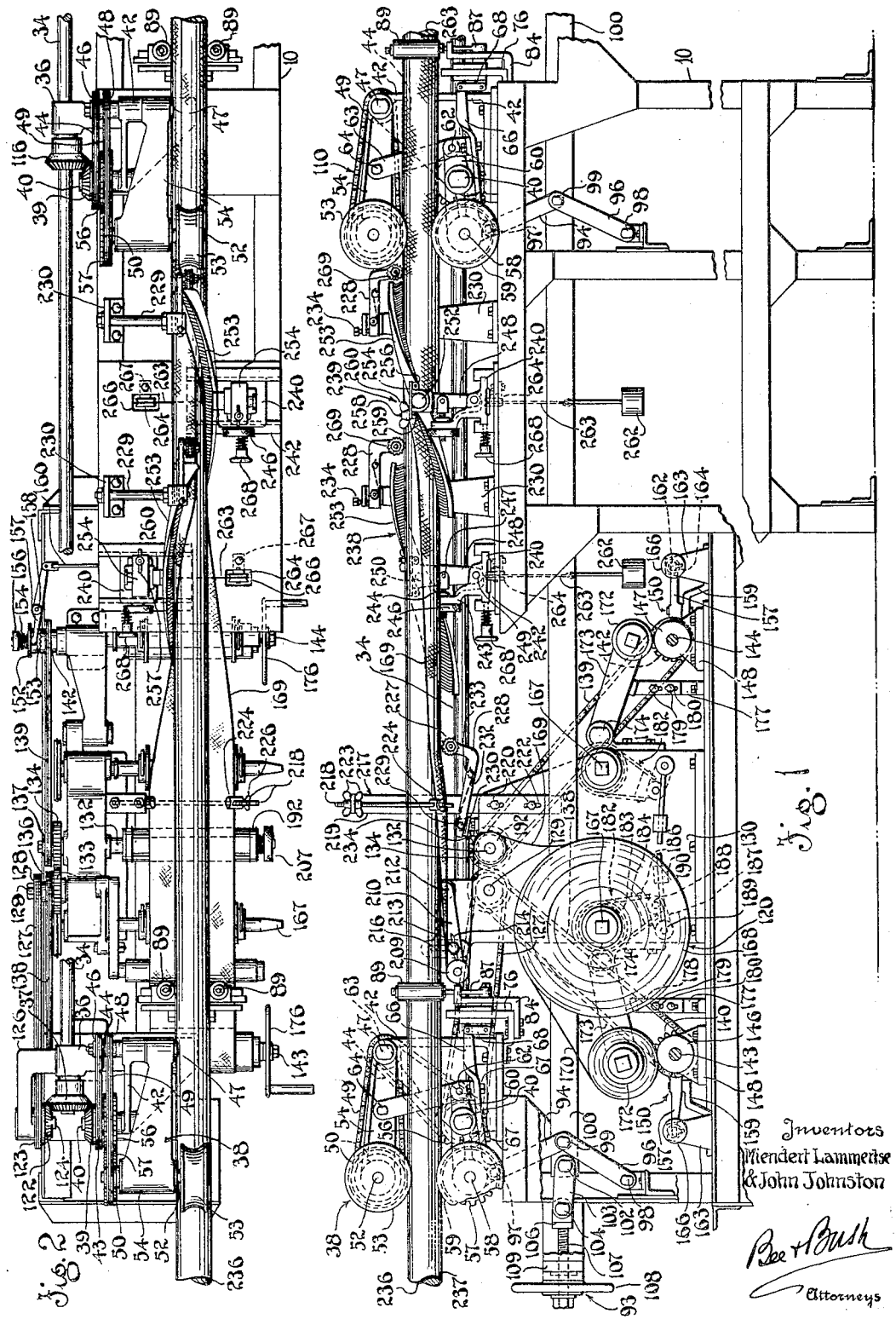
Figure 1 is a fragmentary, side-elevational view of a machine, including an initial strip-applying mechanism.
Figure 2 is a plan view of the construction shown by Figure 1.

Referring to the drawings, an elongate frame 10, which supports all of the mechanisms of the machine, is driven by a motor 12 (Fig. 6) mounted at the base of the frame and provided with a conventional reduction gear 13 that has shafts 14 and 15 driven by the motor and extending from opposite sides thereof. A sprocket wheel 16, carried rigidly by the shaft 15 has a driving engagement with a chain 17 that likewise engages the sprocket wheel 18 mounted rigidly upon one end of a shaft 19. Bearings 20 on the frame 10 rotatably support the shaft, and the other end of the latter rigidly supports a sprocket wheel 23 (Fig. 5) that engages a chain 24 for driving a similar sprocket wheel 26 mounted rigidly upon one end of a shaft 27. Bearing brackets 28 on the frame 10 rotatably support the shaft 27 and the other end thereof rigidly supports a sprocket wheel 29 that engages a chain 30 for driving a cooperating sprocket wheel 33 having a rigid mounting upon a shaft 34. Bearing brackets 36 of the frame 10 rotatably support the shaft 34 and the outer end of the shaft rigidly supports a bevel gear 37 (Fig. 1).

A roller mechanism 38 operated through the gear 37 includes a bevel gear 39 meshing with the latter that is rotatably mounted upon one end of a shaft 40. The other end of the shaft is rigidly secured to a bracket 42 that is bolted, or otherwise conveniently secured, to the frame. A sprocket wheel 43 rigidly secured to the gear 39 also rotates about the shaft 40 and engages a chain 44 likewise engaging a sprocket wheel 46 rotatably mounted upon a shaft 47 that is rigidly secured to the upper portion of the bracket 42. A cooperating sprocket wheel 48 rigidly secured to the sprocket wheel 46 engages a chain 49 likewise engaging a sprocket wheel 50 that is rigidly secured to one end of a shaft 52. The other end of the shaft rigidly supports a grooved roller 53 and its intermediate portion is journaled in the end portion of an arm 54 that is pivoted at its other end portion upon the shaft 47.

An intermediate portion of the shaft 40 rotatably carries a gear 56 meshing with a gear 57 that is rigidly mounted upon a shaft 58. A second grooved roller 59 also rigidly mounted upon the shaft 58, has its grooved portion arranged in opposed relation to the grooved portion of the roller 53. The shaft 58 is journaled in one end of a lever 60 which has its intermediate portion pivoted upon the shaft 40, while its other end is pivotally connected, as indicated at 62, to a link 63. The other end of the link has a pivotal connection 64 to the arm 54.

As best shown by Figures 1, 8 and 9, an arm 66, bolted as indicated at 67 to the lever 60, has a pivotal link connection 68 at its outer end to a block 69 that includes a pair of plates 70 and 72. Lugs 73 serve to space the plates and are vertically slidable in slots 74 of a bracket 76, that has rigid connections 75 to the bracket 42. These plates are secured together by screws 77 extending through the lugs 73. Another pair of slots 78 converging upwardly in the plate 72 is provided with rollers 79 journaled upon the ends of pins 80 that are threaded into blocks 82. Slots 83 in a bracket 84 slidably receive the blocks, and the bracket 84 is bolted, as indicated at 86, to the bracket 76. Bars 87 secured, as indicated at 88, to the ends of pins 85, carried by the blocks 82 are provided with rollers 89 journaled thereon and retained in their proper positions by collars 90 that encircle the bars. Spaced lugs 92 provided on the upper portion of the bracket 84 serve to limit movement of the rollers away from each other. It will be observed that pivotal movement of the lever 60 causes movement of the grooved rollers 53 and 59 toward or away from each other, and also causes like movement of the pair of rollers 89.

The operation on the lever 60 is controlled by an adjusting device 93, including links 94 and 96 having pivotal connections 97 and 98 to the lever 60 and to the frame 10, respectively, and also a common pivotal connection 99 to a horizontally extending bar 100. One end of this bar has a pivotal connection 102 to a link 103 that in turn is pivotally connected, as indicated at 104, to an internally threaded block 106. A rod 107 having one end threaded into the block 104 and the other end rigidly supporting a hand wheel 108, is rotatably mounted in a bracket 109 that constitutes a part of the frame 10. By rotating the hand wheel 108, which is so mounted in the bracket 109 as to prevent axial movement thereof, the rollers 53 and 59, as well as the pair of rollers 89, can be adjusted toward or away from each other, depending upon the direction of rotation. Also, the rollers 53 and 59 can be driven while the hand wheel is being turned, without interfering with the adjustments.

Four other roller mechanisms 110, 112, 113 and 114 are spaced longitudinally of the frame and they are driven by bevel gears 116, 117, 118 and 119, respectively, that are mounted upon the shafts 34 and 19. Since these mechanisms are similar in construction and operation, like reference characters are employed for identifying the corresponding elements of each. In the mechanisms 113 and 114, the cylindrical rollers 89 of the other mechanism have been omitted.

A fabric feeding device 120, operable in synchronism with the roller mechanisms includes a beveled gear 122 meshing with the gear 37, and a sprocket wheel 123 rigidly secured to the gear 122, is rotatably mounted upon a stud shaft 124 projecting rigidly from the bracket 126 of the frame. A chain 127 driven by the sprocket wheel 123 is trained about a sprocket wheel 128 that is rigidly secured to a shaft 129. A frame plate 130 constituting a part of the frame 10 rotatably supports the shaft 129 and likewise rotatably supports an adjacent shaft 132. Gears 133 and 134 mounted rigidly upon the shafts 129 and 132, respectively, mesh with each other and sprocket wheels 136 and 137 rotatable on the shafts are rigidly secured to the gears 133 and 134, respectively. Two chains 138 and 139 engaging the sprocket wheels 136 and 137 extend downwardly in diverging relation and are trained about sprocket wheels 140 and 142, respectively, that are rotatably mounted upon shafts 143 and 144 having rigid connections to rollers 146 and 147, respectively. Journal brackets 148 mounted on the frame rotatably support the rollers. The shafts 143 and 144 are provided with clutch mechanisms 150 which are identical, and accordingly, only one of them is required to be described in detail. The sprocket wheel 142 and a flanged clutch member 152 are provided with interfitting clutch teeth 153 and the clutch member is splined upon the shaft. A spring 154 confined between the clutch member 152 and a collar 156 at the end of the shaft, tends to maintain the teeth 153 in interfitting relation. A lever 157 having one end engaging the clutch member 152, has an intermediate pivotal connection 158 to a bracket 159 of the frame, and its other end is connected to a rod 160 that extends slidably through an opening 162 in a bracket 163 supported by the frame. A collar 164 adjacent the end of the rod is adapted to abut the bracket adjacent the opening and thereby to provide for maintaining the clutch member in or out of engagement with the cooperating sprocket wheel 142. A hand wheel 166 on the end of the rod is employed to manipulate the latter. From this description it will be apparent that one of the rollers 146 or 147 may be driven while the other is idle.

A plurality of shafts 167, each having a polygonal projecting portion is journaled in the frame 130, are each provided with a roll 168 that comprises a rubberized fabric strip 169 wound within the convolutions of a conventional liner 170. A liner-winding roller 172, about which the liner is wound, is rotatably mounted in the outer end portion of an arm 173 that is pivotally mounted, as indicated at 174, in the frame in such manner that the liner on the roller 172 rests by gravity upon the roller 146. Rotation of the roller 146 winds the liner upon the roller 172 according to the peripheral speed of the roller 146. A hand wheel 176 mounted on either shaft 143 or 144 facilitates rotation of the roller 172 for initially winding the liner manually thereon, preparatory to the operation of the machine. In order to maintain the arm 173 in a convenient position when a liner is not wound thereon, a bracket 177, mounted upon the frame, is provided with an adjustable upper bar 178 that is adjustable vertically by means of bolts 179 that are manipulated and secured in slots 180. The shafts 167 and their associated elements are alike, although they operate interchangeably with the liner actuating rollers 146 and 147. When one of the rollers 146 or 147 is not being utilized for rolling the liner, the arm 173 rests upon the bar 178.

Excessive rotation of the roll 168 is prevented by means of a brake 182 comprising a grooved pulley 183 which is secured to each shaft 167, and a flexible brake band 184 looped about the pulley has its ends connected to a block 186. A bell crank lever 187 having a pivotal end connection 188 to the block and its fulcrum 189 on the frame 10, is provided upon its free end portion with a weight 190 slidable thereon to various positions. The degree of frictional resistance between the bar 186 and the pulley 183 depends upon the position of the weight upon the outer end of the lever, and the tension upon the fabric unwound from the roll 168 is thereby varied at will.

The rubberized fabric strip 169 is separated from the liner and extends about a variable roller 192 rotatably mounted upon the shaft 132. This roller (Fig. 7) includes an elongate sleeve 193 disposed between collars 194 and 196 that are splined upon the shaft. A series of projections 197 and 198 correspondingly inclined to the axis of the shaft, are circumferentially spaced upon the collars 194 and 196, respectively. A spring 199 disposed between the collar 194 and an annular integral flange 200 of the shaft, normally urges the collar 194 toward the outer end of the shaft. A plurality of roller segments 202 abut the flange 200 and are disposed about the shaft to provide the periphery of the roller. Internally inclined projections 203 and 204 coact in interfitting relations with the projections 197 and 198, respectively, and these elements are, therefore, locked against relative rotation. Resilient bands 206, preferably of rubber, are stretched about the opposite ends of the roller to maintain the segments in assembled relation. An adjusting thumb screw 207 is threaded upon the outer end of the shaft 132 and a spring 208 is confined between the collar 196 and the screw. By rotating the screw the collars 194 and 196 are actuated axially of the shaft to move the segments 202 radially outwardly, thereby varying the effective circumference of the roller, and consequently providing an adjustment by which the speed of the fabric 169 over the roller may be accurately controlled.

From the roller 192 the fabric is directed about a roller 209 rotatably mounted in the free end of an arm 210 that is pivotally mounted, as indicated at 212, in the frame 10. A bolt 213 having a wing nut 214 threaded thereon, extends through the arm 210 and is disposed in a slot 216 of the frame. Angular adjustment of the arm 210 can be effected by adjusting the bolt in the slot and tightening the wing nut thereon.

After the fabric has been directed over the roller 192, it is drawn between a fabric bending device 217 that comprises a pair of arcuate parallel rods 218, which bend or shape the fabric transversely into arcuate or trough-like contour. One end of each of the rods projects through a bracket 219 which is adjustably secured to the frame 10 by means of bolts 220 extending into the frame, and through slots 222 in the bracket. Wing nuts 223 threaded on the rods, provide an adjustable connection thereof to the bracket. The free ends of the rods are maintained in spaced relation by a cylindrical block 224 through which the rods extend and which is rigidly secured thereto by a set screw 226 threaded into the block and engaging one of the rods.

After the fabric has been bent between the rods 218, its central portion is engaged by a knurled or serrated roller 227 that is journaled in one end of an arm 228, the other end of which has a pivotal connection 229 to a bracket 230 carried by the frame. A spring 232 secured to the bracket 230 extends toward the free end of the arm and resiliently urges the latter upwardly by contacting with a projection 233 thereon. Pivotal movement of the arm is limited by an adjustable set screw 234 that is threaded through the bracket 224 and is adapted to engage the end of the arm opposite that which supports the roller 227. This roller forces the fabric 169 toward an elongate mandrel 236 that is drawn longitudinally through the machine and is supported by the rollers 53, 59 and 89. Before the mandrel is drawn between the rollers mentioned, it is preferably covered with a rubber tube 237. As the mandrel is driven longitudinally between the rollers 53 and 59, the roller 227 stitches an intermediate portion of the fabric between its edges to the lower portion of the mandrel. By manipulating the adjusting device 93, the rollers 53, 59 and 89 can be adjusted to accommodate mandrels of various diameters with equal facility.

Folding devices 238 and 239, which are substantially identical in operation and construction, are provided for folding the fabric about the mandrel after it has been positioned by the roller 227. A description of one of these devices will suffice for a proper understanding of both. Each device includes a slide 240, slidably mounted in a channel base 242 that is rigidly secured to the frame 10 and is provided with an integral projection 243 that has a threaded rod 244 extending therethrough. One end of the rod is provided with a thumb nut 246 and the other end has a pivotal connection 247 to an intermediate portion of an arm 248 that is pivoted at one end, as indicated at 249, to the slide. By rotating the thumb nut, the position of the arm 248 with respect to the slide can be varied. A recess 250 at the outer end of the arm 248 receives a pin 252 of a stiff spiral brush 253 that is maintained in proper position with respect to the arm 248 by means of a releasable clamp 254. One side of the clamp is provided with a hinge connection 256 to the arm and its opposite edge is provided with a slot 257 in which a bolt 258 having a pivotal connection 259 to the arm is normally disposed. The pin 252 constitutes a portion of the brush and is secured firmly with respect to the arm 248 by a wing nut 260 upon the bolt, thereby clamping the pin within the recess 250. The brush 253 yieldably engages the fabric against the mandrel under the influence of a weight 262 that is connected by means of a cable or cord 263 to the slide 240. A suitable pulley 264 disposed in an opening 266 of the frame and journaled upon a bracket 267 carried thereby, supports the cable 263 and properly translates the direction of force exerted by the weight to the slide 240. When it is desired to maintain the brushes in an inoperative position, a pin 268 projecting through the channel base 242 engages one side of the slide to hold the latter in a retracted position. The brushes 253 of the respective folding devices 238 and 239 are oppositely disposed and are spiraled in opposite directions for the purpose of folding the fabric 169 in opposite directions toward its edges until such edges meet, or substantially meet. Since the device 238 operates first, the folded edge portion constituting approximately one half of the fabric with respect to its width, is stitched upon the mandrel, or upon the rubber tube thereon, by a roller 269 identical to the roller 227, and another roller 269 of the same kind stitches the meeting edges of the fabric after it has moved beyond the second folding device 239. Like reference numerals are employed for identifying the associated elements for the rollers 269 and 227.

Figures 3 and 4 illustrate a second fabric-feeding device 270 for directing to the mandrel a second strip of fabric 272 that is wound with a liner 273 into a roll 274. This device is substantially similar in construction to the device 120, and accordingly, like elements thereof are identified by corresponding reference characters. However, the elements of the device 270 are disposed at a position substantially 90 degrees from the position of the device 120 with respect to the path of the mandrel 236. In the second feeding device, the brake band 184 disposed about the grooved pulley 183, is secured at one end, as indicated at 276, to the frame and the other end of the band is secured to a pulley 277 journalled in the frame 10. Rods 278 projecting from opposite sides of the pulley 277 are provided with weights 279 adjustable thereon for regulating the tension of the band and thus regulating the braking action upon the grooved pulley 183. Since the arm 173 is movable about a vertical pivot in the device 270, a cable 280 is connected, as indicated at 282, to the end thereof and it is trained about a pulley 283 that is journaled in the frame 10. A weight 284 suspended from the free end of the cable urges the roller 172 toward the roller 146. Swinging movement of the roller 173 toward either of the rollers 146 or 147 is limited by brackets 285 that are secured to the frame 10. The rollers 146 and 147 of the second device are provided with gears 286 having driving engagement with gears 287 that are rigidly supported by a shaft 288 in the frame 10, and a sprocket wheel 290 mounted intermediate the end of the shaft is driven by a chain 292 that in turn is driven by a sprocket wheel 293 rigidly mounted upon the shaft 34. Intermeshing gears 294 and 295 mounted rigidly upon the shafts 132 and 288, respectively, provide for proper power transmission from the shaft 34 to the roller 192.

Folding devices 296, similar to the devices 238 and 239 are actuated toward the mandrel somewhat differently from the latter because the slides 240 of the devices 296 are vertically movable. A pair of pulleys 297, each journaled in a bracket 298 carried by the frame, support the cable 263 upon which the weight 262 is attached and provides for proper pressure of the brushes 253 against the fabric upon the mandrel. Rollers 299 for stitching the fabric are mounted in the same manner as the roller 227. From this description it will be apparent that the meeting edges of the fabric strip 273 folded about the mandrel will be disposed at substantially 90 degrees from the meeting of the fabric strips 169, previously described.

In order to counteract the tendency of the rollers 299 to move the mandrel laterally, a roller 300, journaled in an arm 302, engages the mandrel opposite the rollers 299. This arm has a pivotal connection 303 to the frame 10 and is provided with a block 304 that has a swivel connection 305 thereto. A rod 307 threaded through the block 304 extends rotatably, but not slidably, through a bracket 308 on the frame, and is provided with a hand wheel 309 by which the rod is rotated. Thus the roller 300 can be adjusted positively toward or away from the mandrel.

A third fabric-feeding device 310, shown by Figure 5, is practically identical to the feeding device 270, and the elements of these devices are identified by corresponding reference characters. However, the device 310 is located diametrically opposite the device 270 with respect to the mandrel. Also, folding devices 312, similar to the devices 296 and their associated elements are likewise correspondingly identified. A third fabric strip 313, wound with a liner 314 in the convolutions of a roll 316, is applied to the second strip 273 in such manner that the meeting edges of the fabric are disposed at 180 degrees from the corresponding edges of the second strip, and 90 degrees from the corresponding edges of the strip 169.

Referring to Figure 6, a fourth strip-applying device 317 and folding devices 318, are constructed in the same manner as the corresponding devices 120 and 238 of Figures 1 and 2, with the exception that the fourth device is mounted above the mandrel 236. Also, certain details of construction are different, which will be apparent as the description proceeds. Rubber strip material 319 and liner material 320 are wound into a roll 322 and mounted upon the shaft 167. According to Fig. 6, the liner and rubber are directed together about a roller 323 mounted on the frame 10 between the shafts 167 and 129, and they are directed about the roller 192. A pair of rollers 324 and 326 also journaled in the frame, are mounted adjacent three relatively smaller rollers 327, 328 and 329 that are geared together. A sprocket wheel 330 carried by the roller 328 engages a chain 332 that is trained about a sprocket wheel 333 carried by the shaft 129. The liner 320 is directed about the roller 326 and thence to the liner-winding roller 172. Likewise, the rubber strip 319 is directed between the rollers 327 and 328, between the rollers 328 and 329, and thence to the mandrel 236 where it is stitched to the rubberized fabric strip thereon by means of a roller 334 having the same associated elements as the roller 227. Likewise, the edge portions of the rubber strip are folded toward each other about the mandrel by the folding devices 318 in the same manner as the rubberized fabric strips previously described are folded.

In order to provide for accurately guiding the rubber strip to the mandrel, a device 336 is pivotally mounted, as indicated at 337, upon the frame 10. This device comprises a bar 338 extending in one direction toward the roll 322 and a rod 339 extending in the opposite direction that has an adjustable weight 340 mounted thereon. Lugs 342 and 343 on the frame 10 and the member 338, respectively, limit pivotal movement of the device away from the roll 322 and when these lugs contact, the device remains in an inoperative position until it is moved again to the position shown by Figure 6.

As best shown by Figure 11, a channel guide 344, rigid with the end of the bar 338, is provided with a pair of internally threaded blocks 346 slidable therein that are threaded upon the opposite end portions of a rod 347 rotatably carried by the guide. The end portions of the rod are threaded in opposite directions in such manner that rotation thereof by a hand wheel 348 of the rod causes the blocks 346 to move toward or away from each other, depending upon the direction of rotation. Ears 349, depending from the blocks, adjustably support pins 350 secured thereto by means of bolts 352. Rollers 353 rotatable upon the pins, are arranged in downwardly diverging relation and are adapted to contact with the edges of the roll 322 in the manner illustrated by Figure 11. Suitable heads 354 formed on the pins 350 maintain the rollers thereon. By varying the position of the weight 340 upon the rod 339, the degree of pressure applied by the rollers 353 against the roll 322 can be varied.

It is apparent from the foregoing description that the invention contemplates progressive application of four strips of material to a mandrel, although more or less than four strips may be applied merely by increasing the number of folding mechanisms. Moreover, the material of which the conduit is composed may be varied as found desirable. Preferably the first three strips applied to the rubber tube on the mandrel are composed of rubberized fabric, and the last strip applied is composed of rubber, thereby providing a conduit having an inner layer of rubber, an outer layer of rubber, and intermediate plies of fabric. It will be observed that the strips of material are applied at peripherally spaced points on the mandrel and also at points spaced longitudinally of the latter. Consequently the seams of the conduit are located in peripherally spaced relation. During operation of the machine, one operator practically can control all of the different manufacturing operations, and most of the time can be positioned in the vicinity of the rubber applying mechanism, thereby insuring that the rubber will be applied with precision. It is apparent that immediately before any roll of fabric becomes exhausted, a second roll of fabric may be mounted on the other fabric roll supporting shaft adjacent thereto, thereby avoiding the necessity of stopping the machine to mount rolls of fabric in place of exhausted rolls. Manifestly, the operation of the machine may be so governed that the rolls of fabric will become exhausted in successive relation and that when it is necessary to substitute a new roll of rubber for the roll of rubber in the last strip applying mechanism, such substitution may be made at a time when none of the rolls of fabric is exhausted. Furthermore, it is apparent that should it be desirable, two rolls of rubber may be utilized in the last mentioned mechanism, instead of the one illustrated.

By means of a machine such as that described and illustrated a rubber conduit may be assembled rapidly and with precision, thereby decreasing considerably the expense incidental to manufacture of conduits, as practiced prior to the invention. It is apparent that each spiral brush by reason of the fact that it is urged resiliently toward the mandrel, insures proper stitching of the fabric, or rubber at all points to the preceding layer on the mandrel. Various dimensions of brushes may be employed in order to accommodate various sizes of mandrels.

Although only the preferred form of the invention has been described and illustrated, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of patentable novelty reside in the invention.

What we claim is:

1. A machine for building conduits of rubberized material upon an elongate mandrel having a rubber tube thereon, comprising means for conducting a strip of rubber material toward the mandrel, means for stitching an intermediate portion of the strip to the tube on the mandrel, means for folding the strip about the mandrel, and other means for stitching the edges of the strip to the tube.

2. A machine for building conduits of rubberized material upon an elongate mandrel comprising means for conducting a strip of rubberized material toward the mandrel, arcuating means for distorting the strip prior to bringing it into contact with the mandrel, and other means for folding the distorted strip about the mandrel, said arcuating means also serving as a guide for the fabric.

3. In a machine for building conduits, a plurality of rollers adapted for supporting an elongate mandrel movable in an axial direction, said rollers being adapted to engage the mandrel at points radially spaced about the periphery of the mandrel, and a common means for adjusting the rollers simultaneously.

4. In a machine for building conduits, a plurality of rollers adapted for supporting an elongate mandrel movable in an axial direction, said rollers being adapted to engage the mandrel at peripherally spaced points, a common means for adjusting the rollers simultaneously, and means for rotating at least one of the rollers.

5. In a machine for building conduits, a plurality of supporting rollers for the conduit, said rollers being spaced about a given line and rotatable about axes extending in different directions, and a common means for moving all of the rollers to and from said line.

6. A roll-supporting member comprising a shaft, a sleeve rotatable with the shaft and slidable longitudinally thereof, said sleeve having a tapered outer peripheral surface, a radially extensible sleeve mounted on the shaft, having a tapered inner peripheral surface cooperating with the tapered surface of the first mentioned sleeve, and means for relatively moving the sleeves in axial direction.

7. A machine for building conduits of rubberized material upon an elongate mandrel comprising means for axially moving the mandrel, means for maintaining the mandrel in a centered position, means for feeding strips to the mandrel, means for curving the strips transversely prior to bringing them into contact with the mandrel, means for stitching a portion of the strips to the mandrel, and means for folding the strips about the mandrel.

8. A machine for building conduits of rubberized material upon an elongate mandrel having a rubber tube thereon, comprising means for axially moving the mandrel, means for maintaining the mandrel in a centered position, means for feeding strips to the mandrel, means for stitching a portion of each strip to the tube on the mandrel, and means for folding the strips about the mandrel, said last mentioned means being spaced longitudinally of the mandrel and including pairs of spiraled brushes disposed at opposite sides of the mandrel.

9. A machine for building conduits of rubberized material upon an elongate mandrel, comprising means for axially moving the mandrel, means for maintaining the mandrel in a centered position, means for feeding strips to the mandrel, means for curving the strips transversely prior to bringing them into contact with the mandrel, means for stitching a portion of the strips to the mandrel, and means for folding the strips about the mandrel, said last mentioned means being spaced longitudinally of the mandrel and including pairs of spiraled brushes disposed at opposite sides of the mandrel.

In witness whereof, we have hereunto signed our names.

Signed at Akron, in the county of Summit and State of Ohio, this 12th day of September, 1930.

MEINDERT LAMMERTSE.
JOHN JOHNSEN.